United States Patent
Lin et al.

(10) Patent No.: US 6,775,111 B2
(45) Date of Patent: *Aug. 10, 2004

(54) TRILAYER SEED LAYER STRUCTURE FOR SPIN VALVE SENSOR

(75) Inventors: Tsann Lin, Saratoga, CA (US); Daniele Mauri, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 10/138,947

(22) Filed: May 3, 2002

(65) Prior Publication Data

US 2002/0181170 A1 Dec. 5, 2002

Related U.S. Application Data

(63) Continuation of application No. 09/429,525, filed on Oct. 28, 1999, now Pat. No. 6,411,476.

(51) Int. Cl.[7] .................................................. G11B 5/39
(52) U.S. Cl. .................................................. 360/324.11
(58) Field of Search ............................... 360/324, 324.1, 360/324.11

(56) References Cited

U.S. PATENT DOCUMENTS 6,046,892 A * 4/2000 Aoshima et al. ........ 360/324.11
6,222,707 B1 * 4/2001 Huai et al. ............... 360/324.1

* cited by examiner

Primary Examiner—Brian E. Miller
(74) Attorney, Agent, or Firm—Ronald B. Feece; Lewis L. Nunnelley

(57) ABSTRACT

A trilayer seed layer structure is employed between a first read gap layer and a spin valve sensor for improving the magnetic and giant magnetoresistive properties and the thermal stability. In the spin valve sensor, the trilayer seed layer structure is located between a first read gap layer and a ferromagnetic free layer. The antiferromagnetic pinning layer is preferably nickel manganese (Ni—Mn). The trilayer seed layer structure includes a first seed layer that is a first metallic oxide, a second seed layer that is a second metallic oxide and a third seed layer that is a nonmagnetic metal. A preferred embodiment is a first seed layer of nickel oxide (NiO), a second seed layer of nickel manganese oxide (NiMnO$_x$), and a third seed layer of copper (Cu).

6 Claims, 17 Drawing Sheets

TRILAYER SEED LAYER STRUCTURE FOR SPIN VALVE SENSOR

CROSS REFERENCE TO RELATED APPLICATION

This application is a continuation of U.S. application Ser. No. 09/429,525 filed on Oct. 28, 1999 now U.S. Pat. No. 6,411,476, owned by a common assignee and having the same inventors as the present invention.

BACKGROUND OF THE INVENTION

1. Field of the Invention

The present invention relates to a seed layer structure for a spin valve sensor and, more particularly, to a trilayer seed layer structure which improves the magnetic and giant magnetoresistive properties and the thermal stability of the spin valve sensor by improving its microstructure.

2. Description of the Related Art

The heart of a computer is an assembly that is referred to as a magnetic disk drive. The magnetic disk drive includes a rotating magnetic disk, a slider that has write and read heads, a suspension arm that supports the slider above the rotating disk and an actuator that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic impressions from the rotating disk. The read and write heads are connected to processing circuitry that operates according to a computer program to implement the writing and reading functions.

The read head includes a sensor that is located between nonmagnetic electrically insulative first and second read gap layers and the first and second read gap layers are located between ferromagnetic first and second shield layers. The write head includes a coil layer embedded in first, second and third insulation layers (insulation stack), the insulation stack being sandwiched between first and second pole piece layers. A write gap is formed between the first and second pole piece layers by a nonmagnetic gap layer at an air bearing surface (ABS) of the write head. The pole piece layers are connected at a back gap. Current conducted to the coil layer induces a magnetic field into the pole pieces that fringes across the gap between the pole pieces at the ABS. The fringe field writes information in tracks on moving media, such as in circular tracks on a rotating disk.

In recent read heads a spin valve sensor is employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer, respectively. First and second leads are connected to the spin valve sensor for conducting a sense current therethrough. The magnetization of the pinned layer is pinned perpendicular to an air bearing surface (ABS) of the head and the magnetization of the free layer is oriented parallel to the ABS but free to rotate in response to external magnetic fields. The magnetization of the pinned layer is typically pinned by exchange coupling to an antiferromagnetic pinning layer.

The thickness of the spacer layer is chosen so that shunting of the sense current and a magnetic coupling between the free and pinned layers are minimized. This thickness is less than the mean free path of conduction electrons through the sensor. With this arrangement, a portion of the conduction electrons is scattered by the interfaces of the spacer layer with the pinned and free layers. When the magnetizations of the pinned and free layers are parallel with respect to one another, scattering is minimal and when the magnetizations of the pinned and free layers are antiparallel, scattering is maximized. Changes in scattering alter the resistance of the spin valve sensor in proportion to $\cos\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor resistance changes cause potential changes that are detected and processed as playback signals by the processing circuitry.

The spin valve sensor is characterized by a giant magnetoresistance (GMR) coefficient that is substantially higher than the anisotropic magnetoresistance (AMR) coefficient of an AMR sensor. The GMR coefficient is $\Delta R_G/R_\parallel$ where $\Delta R_G$ is the difference between the resistance measured when the magnetizations of the pinned and free layers are antiparallel with respect to one another and the resistance ($R_\parallel$) when the magnetizations of the pinned and free layers are parallel with respect to one another. A spin valve sensor is sometimes referred to as a GMR sensor. When a spin valve sensor employs a single pinned layer it is referred to as a simple spin valve sensor.

Another type of spin valve sensor is an antiparallel (AP) pinned spin valve sensor. The AP pinned spin valve sensor differs from the simple spin valve sensor in that an AP pinned structure has multiple thin film layers instead of a single pinned layer. The AP pinned structure has an AP coupling layer sandwiched between first and second ferromagnetic pinned layers. The first pinned layer has its magnetization oriented in a first direction by exchange coupling to the antiferromagnetic pinning layer. The second pinned layer is immediately adjacent to the spacer layer and is antiparallel exchange coupled to the first pinned layer across the AP coupling layer (having a thickness of the order of 8 Å) between the first and second pinned layers. Accordingly, the magnetization of the second pinned layer is oriented in a second direction that is antiparallel to the first direction of the magnetization of the first pinned layer.

Antiferromagnetic nickel-manganese (Ni—Mn), platinum manganese (Pt—Mn) and iridium manganese (Ir—Mn) films have been used extensively as pinning layers for both simple and AP pinned spin valve sensors. The Ni—Mn and Pt—Mn films must be annealed at about 280° C. after deposition to cause a transformation from a nonmagnetic face-centered-cubic (fcc) phase to an antiferromagnetic face-centered-tetragonal (fct) phase. The anneal is not needed for the Ir—Mn film which contain an antiferromagnetic face-centered-cubic phase after deposition. Spin valve sensors using an Ni—Mn antiferromagnetic layer require post deposition anneals of about 12 hours at 280° C. to develop a unidirectional anisotropy field ($H_{UA}$) of 622 Oe, however this extended anneal causes a decrease in the GMR coefficient from 5.8% to 2.4% when a conventional tantalum seed layer is used.

Therefore, there is a need for an improved seed layer structure to allow Ni—Mn spin valve sensors to be suitably annealed to develop a high unidirectional anisotropy field with good thermal stability without degradation of the GMR coefficient.

SUMMARY OF THE INVENTION

We found by employing a trilayer seed layer structure between a simple spin valve sensor having a nickel manganese (Ni—Mn) pinning layer and an aluminum oxide ($Al_2O_3$) first read gap layer that the giant magnetoresistance coefficient (GMR) is 9.4% as compared to 5.8% and 6.8% when single seed layers of Ta and $NiMnO_x$, respectively, are used. The trilayer seed layer structure includes a first seed layer made of polycrystalline nickel oxide (NiO), a second seed layer made of amorphous-like nickel manganese oxide ($NiMnO_x$) and a third seed layer made of copper (Cu). The first seed layer interfaces the aluminum oxide ($Al_2O_3$) first read gap layer, the second seed layer interfaces the first seed layer, and the third seed layer is disposed between the second seed layer and the free layer. The trilayer seed layer may be employed in either a simple spin valve sensor or an antiparallel pinned spin valve sensor.

An object of the present invention is to improve the magnetic and GMR properties of a spin valve sensor when the pinning layer is made from a class of materials including nickel manganese (Ni—Mn) and nickel manganese based alloys (Ni—Mn—M) where M is a third metallic element such as chromium (Cr), iron (Fe), iridium (Ir), paladium (Pd), platinum (Pt), rhodium (Rh) and ruthenium (Ru).

Another object of the present invention is to provide a read head with a spin valve sensor that has improved thermal stability.

A further object of the present invention is to provide a seed layer structure for a spin valve having a nickel manganese (Ni—Mn) pinning layer to improve its magnetic and GMR properties with good thermal stability.

Other objects and advantages of the invention will become apparent upon reading the following description taken together with the accompanying drawings.

DESCRIPTION OF THE PREFERRED EMBODIMENTS

Magnetic Disk Drive

Figure 1:
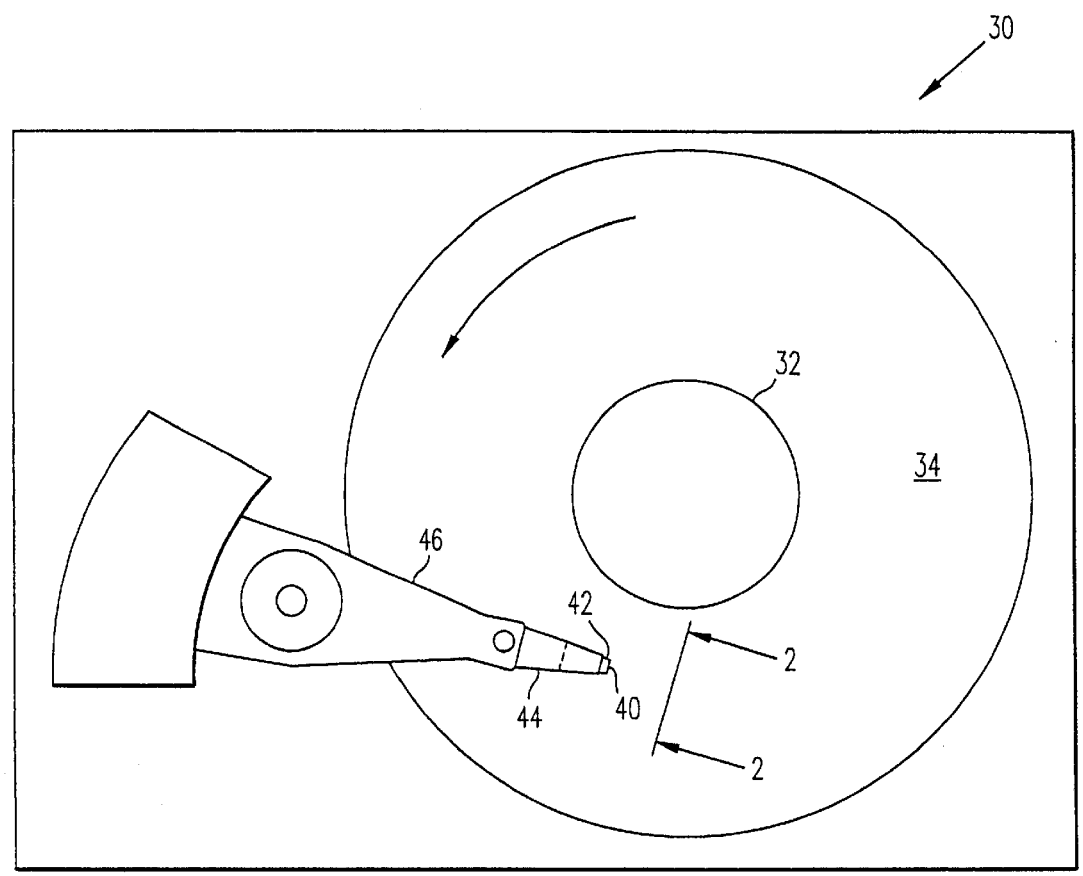
FIG. 1 is a plan view of an exemplary magnetic disk drive.
Figure 2:
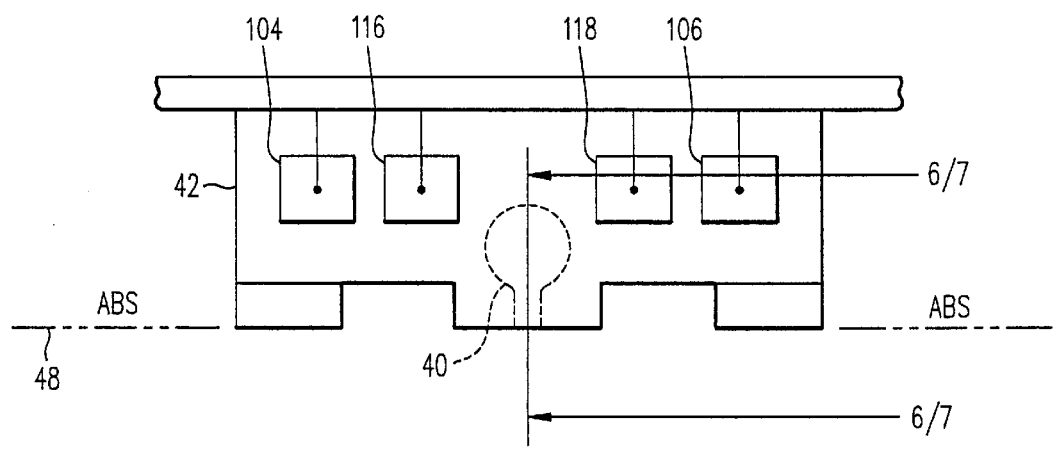
FIG. 2 is an end view of a slider with a magnetic head of the disk drive as seen in plane 2—2.
Figure 3:
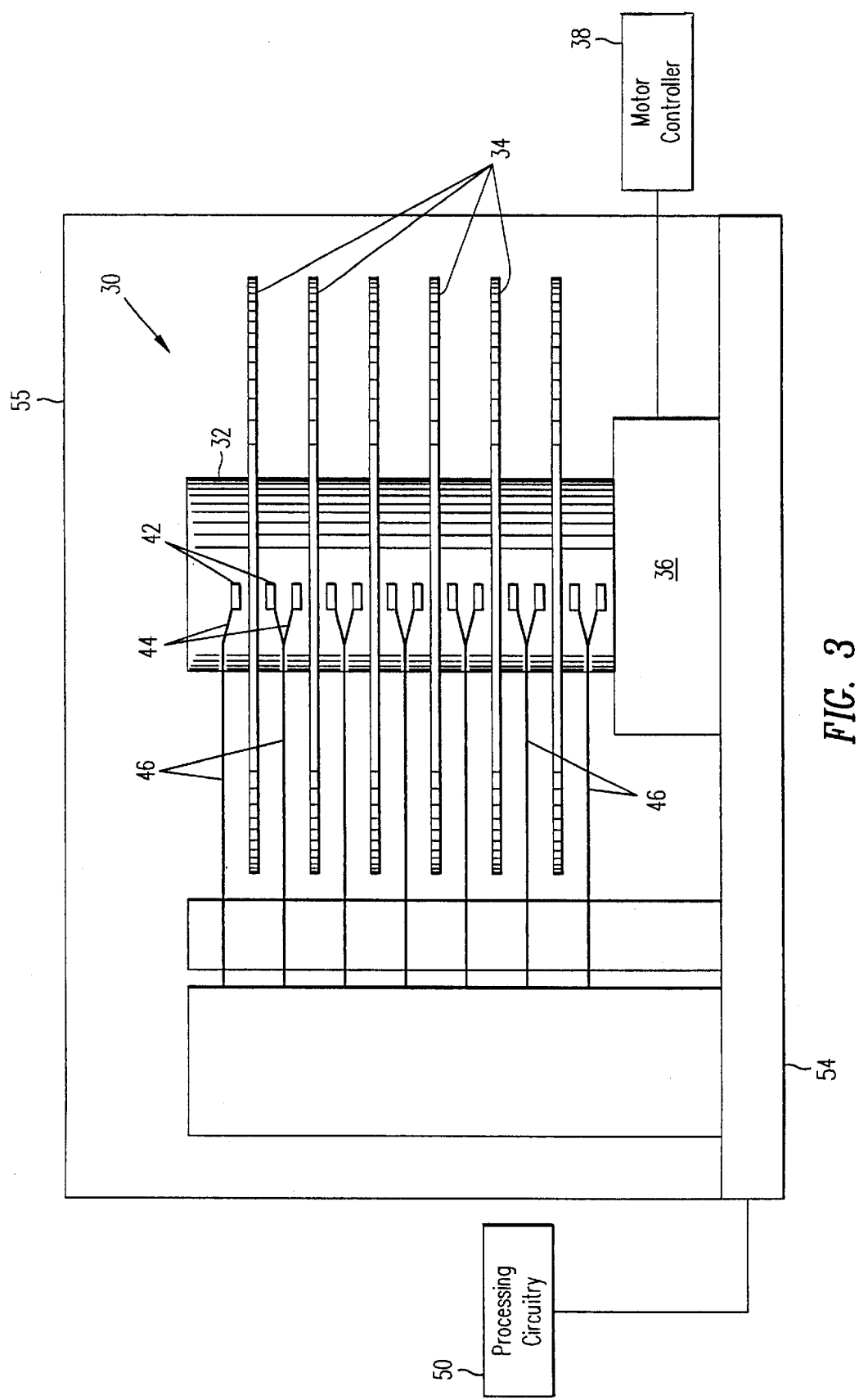
FIG. 3 is an elevation view of the magnetic disk drive wherein multiple disks and magnetic heads are employed.
Figure 4:
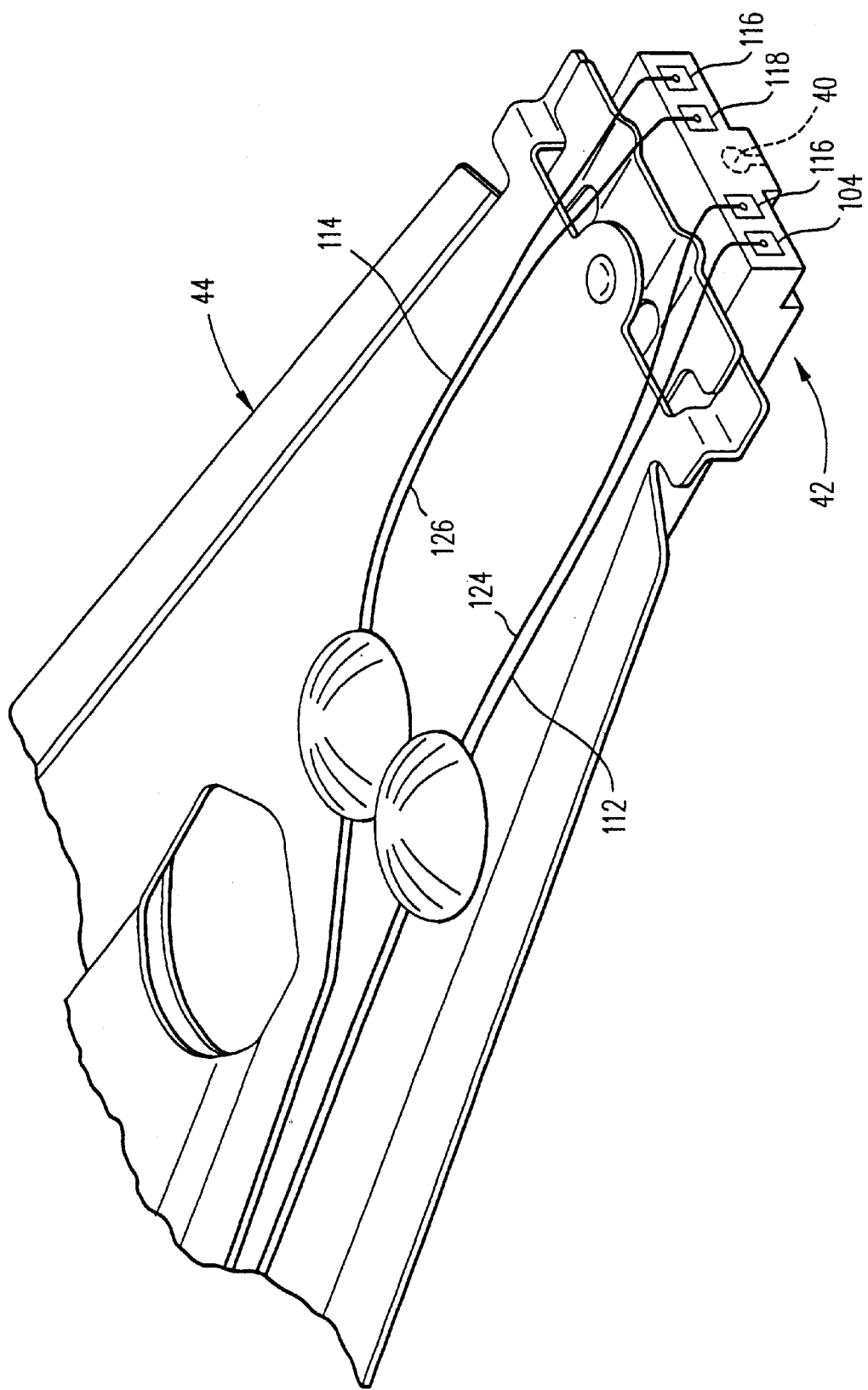
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A slider 42 with a combined read and write magnetic head 40 is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a suspension 44. The components described herein above may be mounted on a frame 54 of a housing, as shown in FIG. 3.

Figure 5:
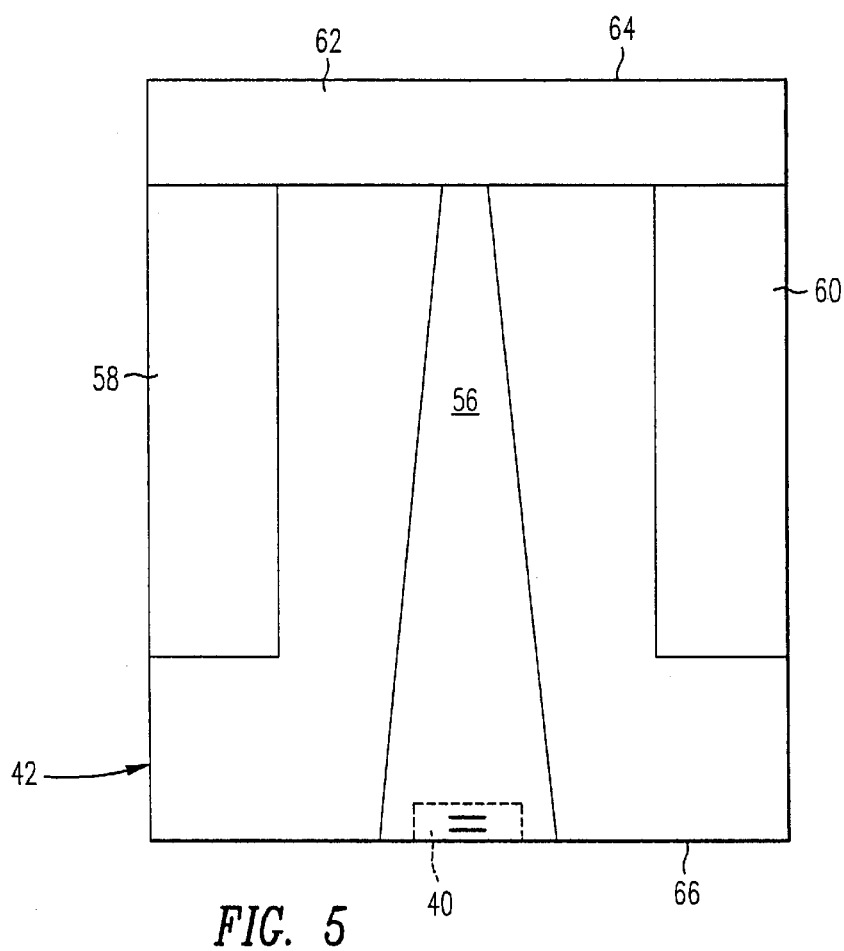
FIG. 5 is an ABS view of the magnetic head taken along plane 5—5 of FIG. 2.
Figure 10:
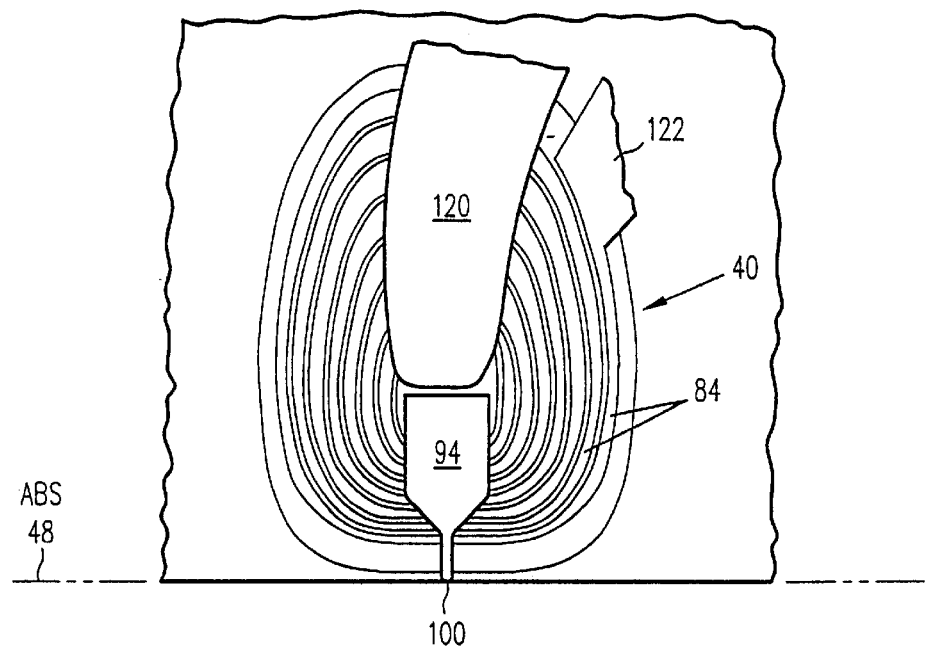
FIG. 10 is a view taken along plane 10—10 of FIG. 6 or 7 with all material above the coil layer and leads removed.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
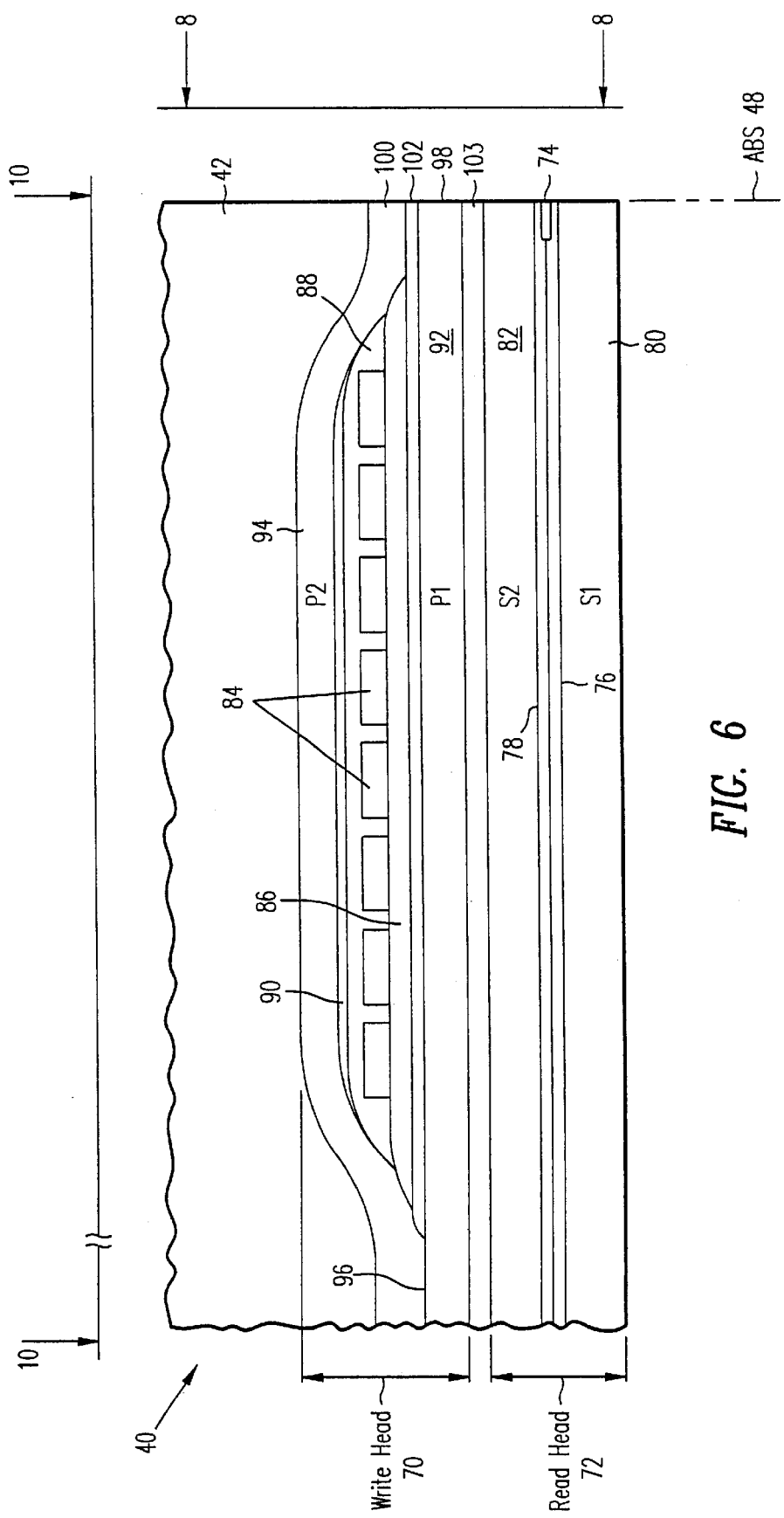
FIG. 6 is a partial view of the slider and a piggyback magnetic head as seen in plane 6—6 of FIG. 2.
Figure 8:
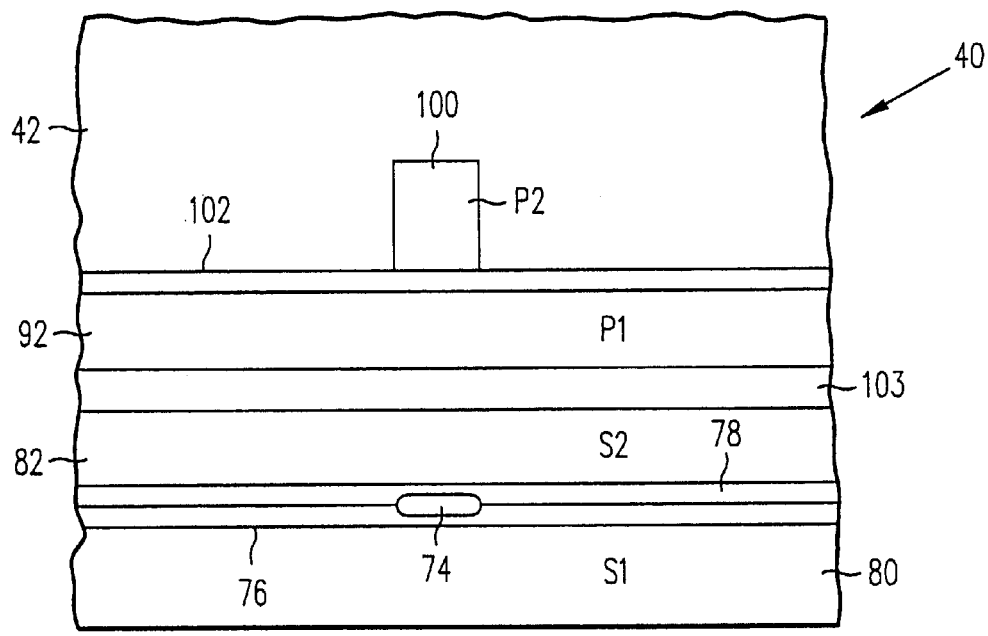
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_s$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback magnetic head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 7:
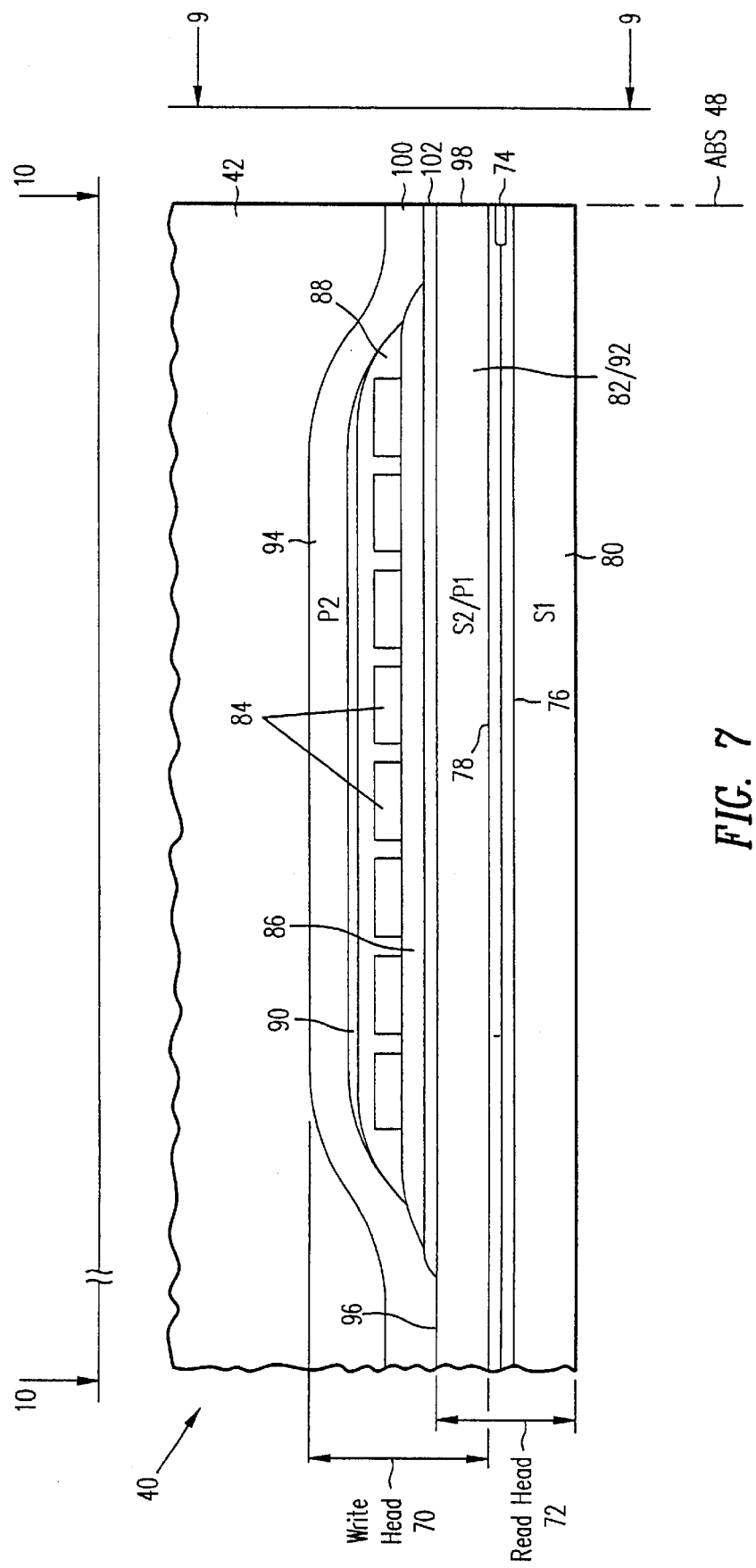
FIG. 7 is a partial view of the slider and a merged magnetic head as seen in plane 7—7 of FIG. 2.
Figure 9:
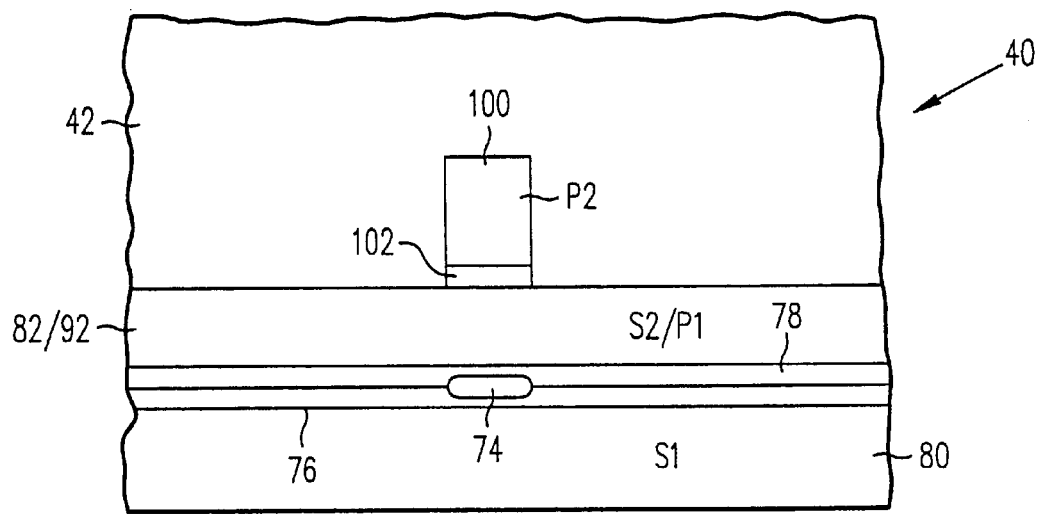
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
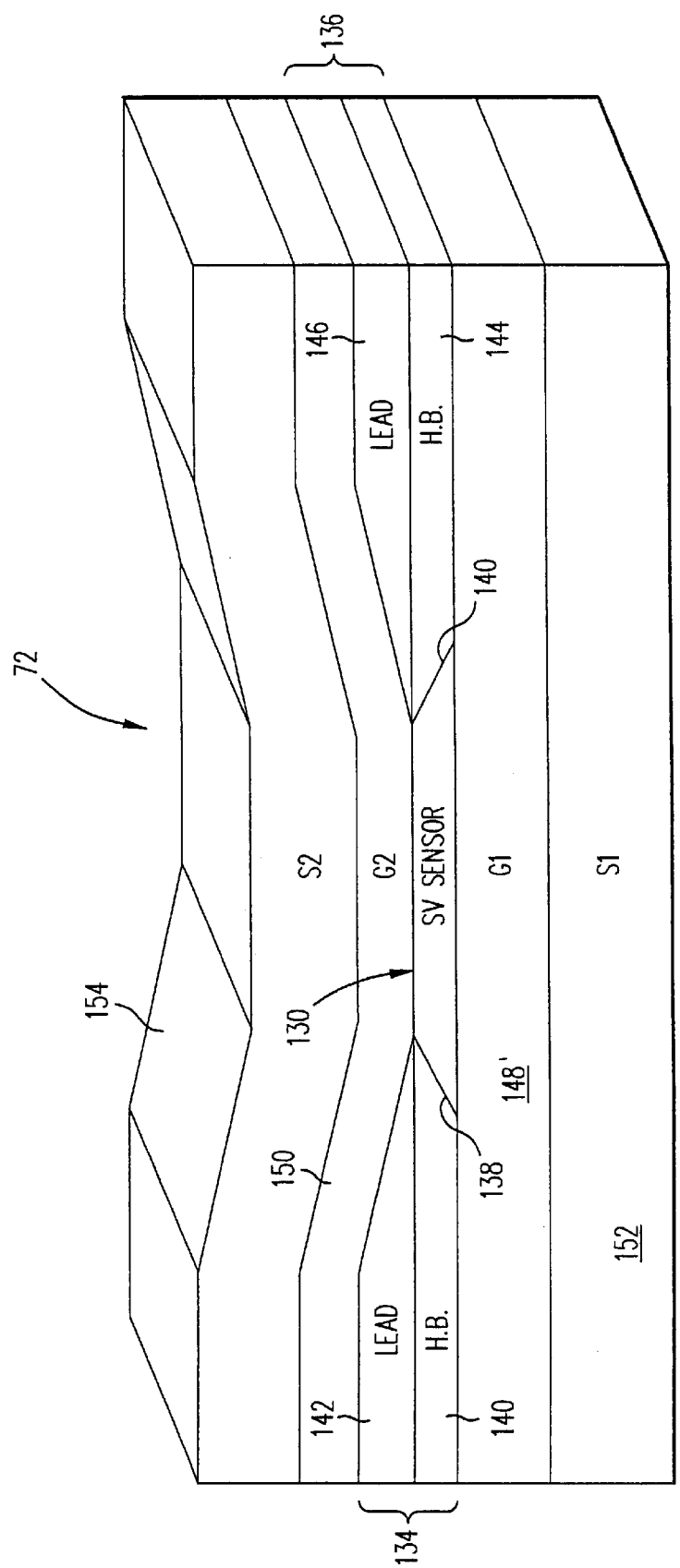
FIG. 11 is an isometric ABS view, not to scale, of a read head which employs a simple spin valve sensor.

FIG. 11 is an isometric ABS illustration of the read head 72 shown in FIG. 6 or 8. The read head 72 includes the present spin valve sensor 130 which is located on an insulating first read gap (G1) 148. A ferromagnetic pinned layer in the spin valve sensor 130, which is to be described hereinafter, has a magnetization that is pinned by exchange coupling to an antiferromagnetic pinning layer. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing magnetic domains of a ferromagnetic free layer therein. The spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154. The present invention provides a trilayer seed layer structure below the spin valve sensor for improving its magnetic and GMR properties and its thermal stability.

In the following four examples, various layers underlying a spin valve sensor and layers of the spin valve sensor were deposited in a sputtering system having DC magnetron sputtering and ion beam sputtering modes of film deposition. Various targets were sputtered in an argon (Ar) gas environment in the DC magnetron mode or by xenon (Xe) ions in the ion beam sputtering mode. Sputtered material from the target was deposited on a substrate to form the layers. After completion of the spin valve sensor, the spin valve sensor was annealed for a predetermined period of time at a predetermined temperature in the presence of a magnetic field oriented in a transverse direction to the ABS. For the simple spin valve sensors, the anneal temperature was 280° C. in the presence of a magnetic field of 800 Oe for 2 hours. For the antiparallel pinned spin valve sensor, the anneal temperature was 260° C. in the presence of a magnetic field of 10 kOe for 10 hours. In each of the examples, the ferromagnetic coupling field ($H_F$), the GMR coefficient and the undirectional anisotropy field ($H_{UA}$) were measured. The GMR coefficient is determined from the difference in magnetoresistance when the magnetizations of the pinned and free layers are parallel and antiparallel divided by the resistance ($R_∥$) measured when the magnetizations of the pinned and free layers are parallel. The aforementioned ferromagnetic coupling field ($H_F$) is the field exerted on the free layer by the pinned layer due to exchange coupling between the free and pinned layers. This field should be kept relatively low, such as 10 Oe, so as to minimize difficulties in controlling an optimal bias point of the spin valve sensor, where the bias point is the point on a transfer curve of the spin valve sensor when a sense current $I_s$ is conducted through the sensor without any signal field. The bias point should be located midway on the transfer curve and, if it is offset from the midway position, the read sensor has read signal asymmetry. The transfer curve is a plot of the change in magnetoresistance versus a change in the applied field.

EXAMPLE 1

Figure 12:
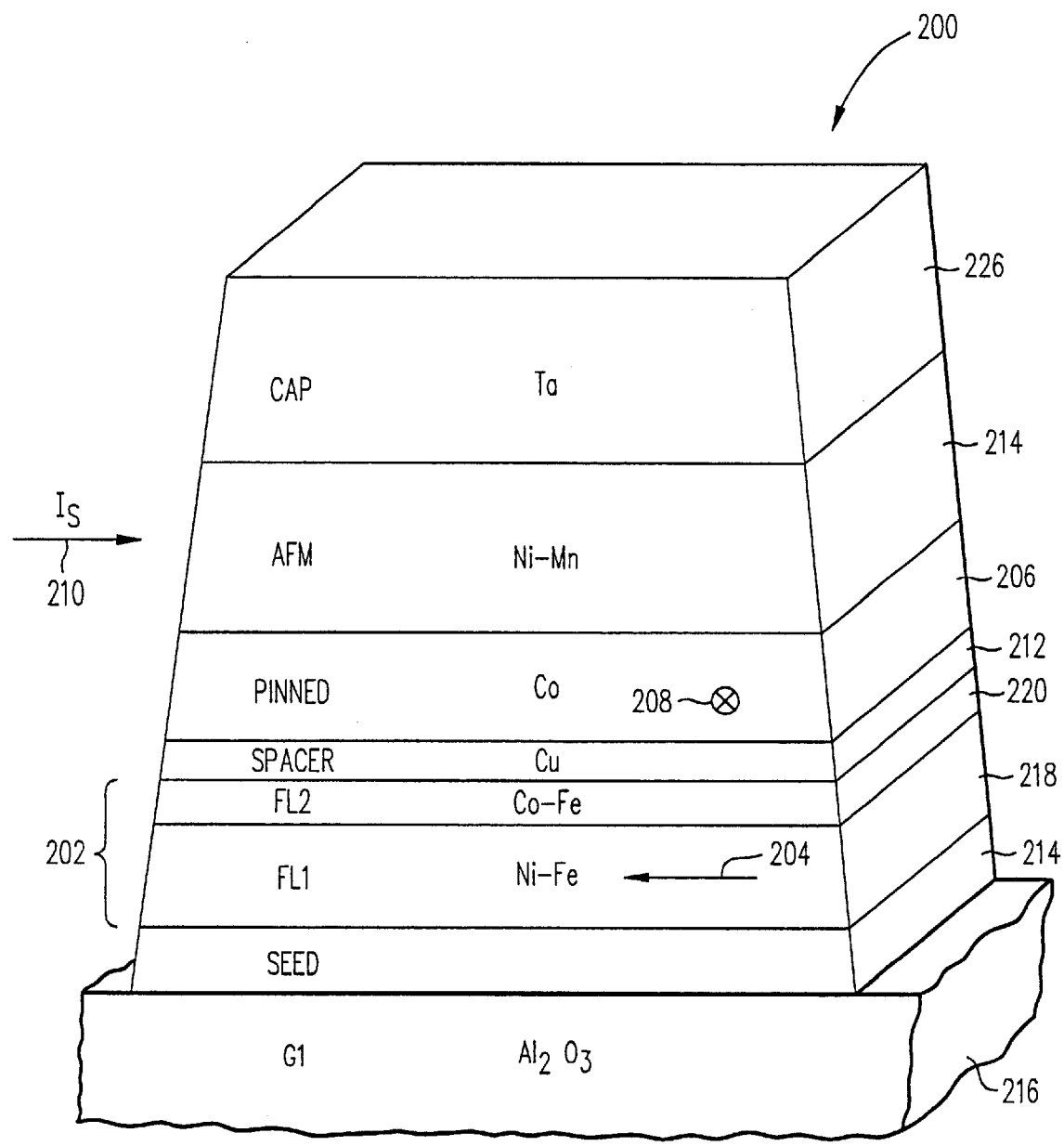
FIG. 12 is an isometric ABS view, not to scale, of a first example of a simple spin valve sensor investigated by us.

A first example of a simple spin valve sensor 200 is shown in FIG. 12. The spin valve sensor 200 includes a ferromagnetic free layer 202 having a magnetization 204 that is free to rotate from a first direction in response to a signal field from a track of a rotating magnetic disk. The magnetization 204 is typically oriented parallel to the ABS, as shown at 204 in FIG. 12. The spin valve sensor also includes a ferromagnetic pinned layer 206 having a magnetization 208 oriented in a second direction. The second direction is typically perpendicular to the ABS and may be directed away from or toward the ABS, the preferred direction being away from the ABS when a sense current $I_s$ 210 flows from left to right. The magnetization 208 is pinned and is not free to rotate while the magnetization 204 freely rotates in response to signal fields from the rotating magnetic disk. When the magnetization 204 is rotated upwardly into the paper by a signal field the magnetizations 204 and 208 become more parallel which decreases the resistance of the spin valve sensor. When the magnetization 204 is rotated downwardly or out of the paper by a signal field, the magnetizations 204 and 208 become more antiparallel which increases the resistance. When the sense current $I_s$ 210 is conducted through the sensor, changes in the resistance cause changes in the potential of the sense current circuit which are processed by the processing circuitry 50 in FIG. 3 to produce a read signal.

A nonmagnetic electrically conductive spacer layer 212 is located between the free layer 202 and the pinned layer 206. An antiferromagnetic pinning layer 214 interfaces and is exchange coupled to the pinned layer 206 for pinning the magnetization 208 perpendicular to the ABS. The free layer 202 is located on a seed layer 214 made of tantalum (Ta), or alternatively of nickel manganese oxide (NiMnO$_x$), which is located on a first read gap layer (G1) 216 which is typically aluminum oxide (Al$_2$O$_3$). The preferred free layer 202 is a laminated structure comprising a first ferromagnetic sublayer 218 made of nickel iron (Ni—Fe or Permalloy) and a second ferromagnetic sublayer 220 made of cobalt iron (Co—Fe) as shown in FIG. 12.

In this example, the pinning layer 214 was 250 Å of nickel manganese (Ni—Mn), the pinned layer 206 was 32 Å of cobalt (Co), the spacer layer 212 was 24 Å of copper (Cu) and the free layer 202 was a first ferromagnetic sublayer 218 made of 45 Å of nickel iron (Ni—Fe) and a second ferromagnetic sublayer 220 made of 6 Å of cobalt iron (Co—Fe). The cap layer 226 was 60 Å of tantalum (Ta) on the pinning layer 214 for protecting the pinning layer. The seed layer 214 was 30 Å of tantalum (Ta). Alternatively, the pinning layer 206 may be formed of platinum manganese (Pt—Mn) or iridium manganese (Ir—Mn).

After annealing at 280° C. for 2 hours, the spin valve sensor 200 exhibited a GMR coefficient of 5.8%, a unidirectional anisotropy field (H$_{UA}$) between the pinning layer and the pinned layer of 76 Oe, and a ferromagnetic coupling field (H$_F$) of 7.4 Oe. The GMR coefficient and the unidirectional anisotropy field (H$_{UA}$) are relatively low. Alternatively, when a NiMnO$_x$ seed layer 214 having a thickness of 30 Å was employed between the first ferromagnetic sub-layer 218 of the free layer 202 and the first read gap layer 216, the GMR coefficient is 6.8%, the unidirectional anisotropy field (H$_{UA}$) is 412 Oe and the ferromagnetic coupling field (H$_F$) is 11.2 Oe. An objective of the present invention is to improve the GMR coefficient and the unidirectional anisotropy field (H$_{UA}$) while maintaining a low value of the ferromagnetic coupling field (H$_F$). A further objective of the present invention is to improve the thermal stability of the spin valve sensor, in particular, to ensure a low H$_F$ and a high GMR coefficient after an extended anneal at elevated temperature.

EXAMPLE 2

First Embodiment of Invention

Figure 13:
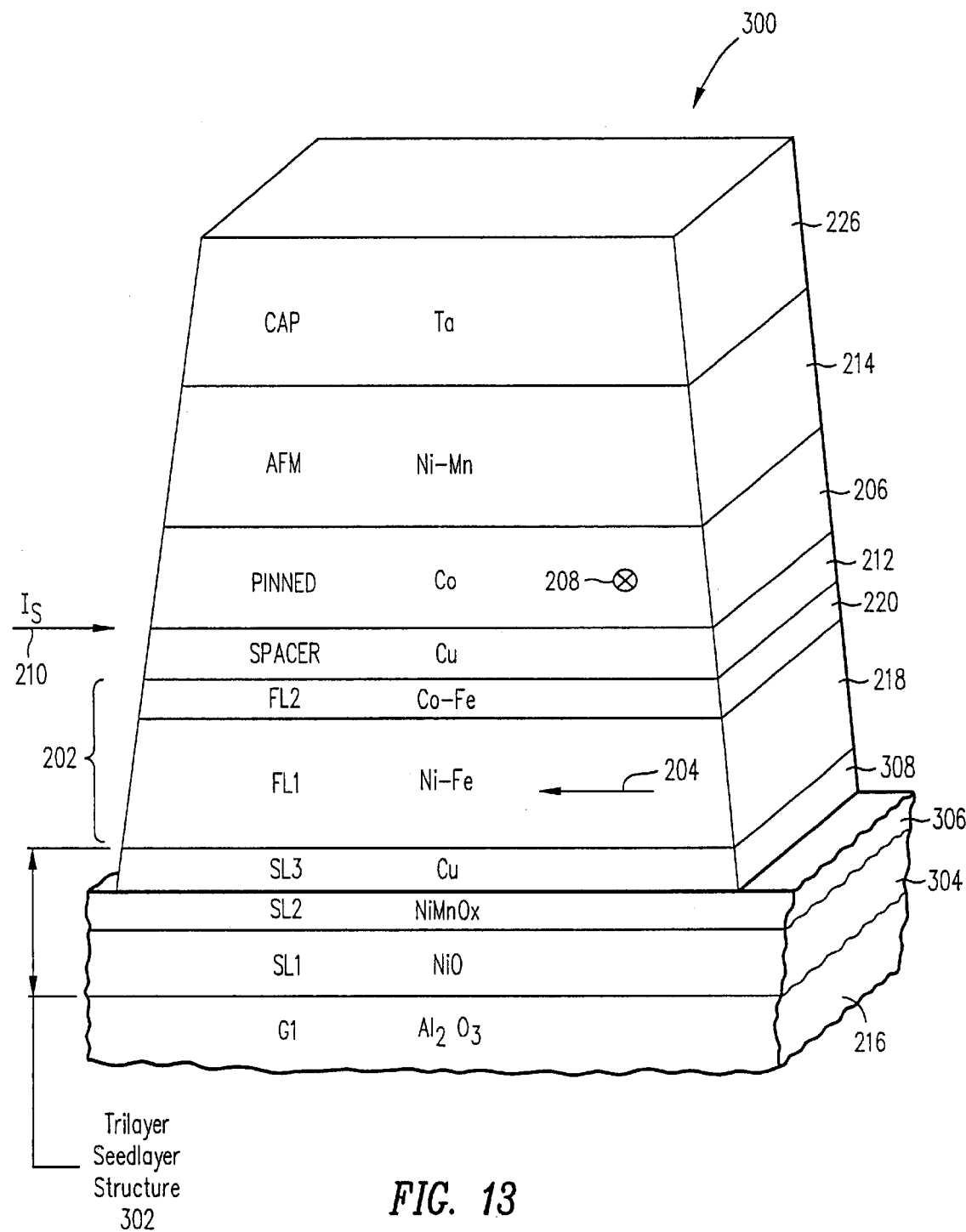
FIG. 13 is an isometric ABS view, not to scale, of a second example of a simple spin valve which is one embodiment of the present invention wherein a trilayer seed layer is employed between the free layer and the first read gap layer.

The spin valve sensor 300 in FIG. 13 is a first embodiment of the present invention. The spin valve sensor 300 is the same as the spin valve sensor 200 in FIG. 12 except for a trilayer seed layer (SL) structure 302 that is located between the first read gap layer 216 and the first ferromagnetic sublayer 218 of the free layer 202. The trilayer seed layer structure 302 has a first seed layer (SL1) 304 comprising nickel oxide (NiO), a second seed layer (SL2) 306 comprising an amorphous-like oxide, preferably nickel manganese oxide (NiMnO$_x$), and a third seed layer (SL3) 308 comprising a nonmagnetic high-conductance metal, preferably copper (Cu). Alternatively, the third seed layer may be made of silver (Ag), gold (Au), and their alloys. The first seed layer 304 is located on and interfaces the first read gap layer 216, the second seed layer 306 interfaces and is located between the first seed layer 304 and the third seed layer 308, and the third seed layer 308 is located on the second seed layer 306 and interfaces the first ferromagnetic sublayer 218 of the free layer 202. In this example, the first seed layer 304 was 330 Å of nickel oxide (NiO), the second seed layer 306 was 30 Å of nickel manganese oxide (NiMnO$_x$), and the third seed layer was 14 Å of copper (Cu). Since the first and second seed layers 304 and 306 are made of electrically insulative materials, the first second seed layers 304 and 306 may be deposited so as to add to the thickness of the first gap (G1) 216.

After annealing at 280° C. for 2 hours, the spin valve sensor 300 exhibits a GMR coefficient of 9.4%, a unidirectional anisotropy field (H$_{UA}$) of 590 Oe and a ferromagnetic coupling field (H$_F$) of 2.7 Oe. The GMR coefficient of the spin valve sensor 300 is a significant improvement over the GMR coefficients of the spin valve sensor 200 having a Ta or NiMnO$_x$ seed layer. It has been found that this improvement is mainly due to the nickel oxide (NiO) first seed layer 304 exhibiting a strong {200} crystalline texture thereby inducing a desirable {200} crystalline texture of the subsequently deposited layers of the spin valve sensor. This finding is attained from low-angle x-ray diffraction patterns which show a strong fcc {111} crystalline texture in the as-deposited Ni—Mn spin valve sensor 200 having the Ta or NiMnO$_x$ seed layer, and a weak fcc {111} crystalline texture and an additional fcc {200} crystalline texture in the as-deposited Ni—Mn spin valve sensor 300 having the trilayer seed layer or only the NiO seed layer. The existence of this {200} crystalline texture facilitates the transformation from a fcc phase with the {200} crystalline texture to a fct phase with (200), (020) and (002) crystalline textures in the Ni—Mn film after annealing. As a result, the Ni—Mn spin valve sensor 300 having the trilayer seed layer structure or only the NiO seed layer requires less anneal time to attain a high unidirectional anisotropy field (H$_{UA}$) while maintaining a high GMR coefficient.

The use of a thicker NiO layer leads to a higher GMR coefficient, but also leads to exchange coupling between the antiferromagnetic NiO and the ferromagnetic free layer. The thin nonmagnetic layers of NiMnO$_x$ and Cu of the second and third seed layers 306 and 308, respectively, inserted between the NiO and the free layer prevent the exchange coupling. Insertion of both the thin NiMnO$_x$ and Cu seed layers also results in a further increase of the GMR coefficient.

The NiMnO$_x$ seed layer plays a crucial unique role in attaining a very low ferromagnetic coupling field (H$_F$). It is observed from cross-sectional transmission electron micrographs that that the thin amorphous-like NiMnO$_x$ seed layer covers the boundary grooving of polycrystalline grains of the thick polycrystalline NiO seed layer, thereby providing a smooth topography. Due to this smooth topography, the ferromagnetic coupling field (H$_F$) oscillates with thickness of the Cu spacer layer, thus providing an H$_F$ of less than 4 Oe over a wide thickness range of the Cu spacer layer (with a minimum H$_F$ of 2.7 Oe when the Cu spacer layer is 24 Å thick). It should also be noted that the amorphous-like NiMnO$_x$ seed layer must be very thin so as not to impact the microstructural effect of the thick NiO seed layer on the layers of the spin valve while suppressing the exchange coupling and providing a low ferromagnetic coupling field (H$_F$).

The Cu seed layer also plays a crucial unique role in maintaining good soft ferromagnetic properties of the free layer. Direct contact of either the NiO or the NiMnO$_x$ seed layers with the free layer leads to degradation of the soft magnetic properties of the free layer, particularly after annealing. The thin Cu seed layer is therefore inserted between the NiMnO$_x$ seed layer and the free layer. With insertion of the Cu seed layer, the easy axis coercivity (H$_{CE}$) of the free layer decreases from 6.5 Oe to 3.5 Oe, and more importantly, the uniaxial anisotropy field (H$_K$) of the free layer decreases substantially from 15 Oe to 6 Oe. The decrease in the uniaxial anisotropy field (H$_K$) indicates an increase in permiability of signal fields from a recording medium. In addition, the use of the Cu seed layer leads to a higher GMR coefficient due to specular electron scattering. It should be noted that the high conduction Cu seed layer must also be very thin to minimize current shunting in the spin valve sensor while maintaining the good soft ferromagnetic properties of the free layer and increasing the GMR coefficient.

Thus, the use of a trilayer seed layer comprising first, second and third seed layers 304, 306, 308 of NiO, NiMnO$_x$ and Cu, respectively, substantially increases the GMR coefficient, increases the unidirectional anisotropy field (H$_{UA}$) and decreases ferromagnetic coupling field (H$_F$) compared to the use of single seed layers of either Ta or NiMnO$_x$ for the spin valve sensor 200 described in the Example 1.

EXAMPLE 3

Second Embodiment of Invention

Figure 14:
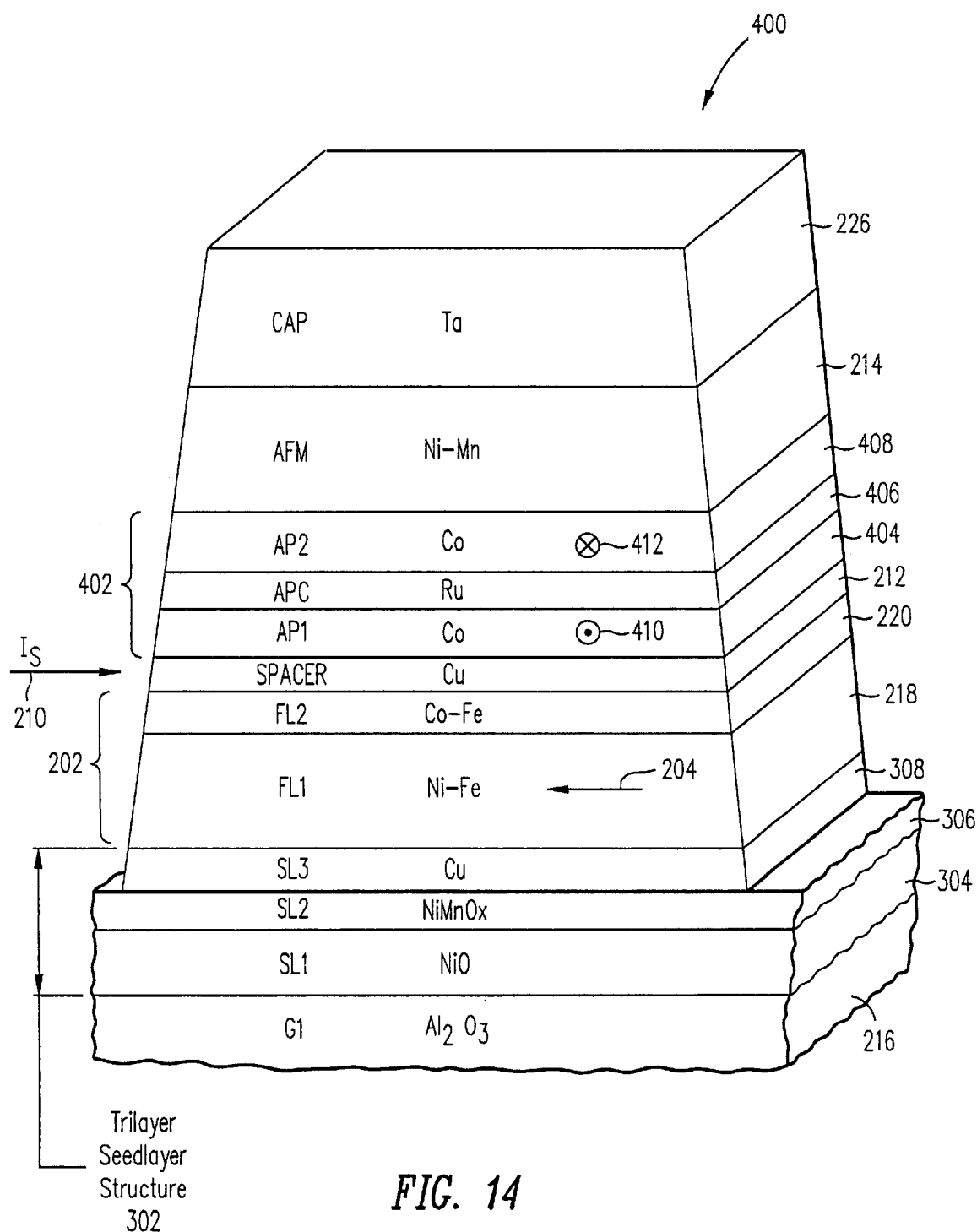
FIG. 14 is an isometric ABS view, not to scale, of a third example which is a second embodiment of the present invention wherein a trilayer seed layer structure is employed between the first gap layer and the free layer of an antiparallel pinned spin valve sensor.

The spin valve sensor 400 in FIG. 14 is a second embodiment of the present invention. This spin valve sensor is the same as the spin valve sensor 300 in FIG. 13 except an antiparallel (AP) pinned layer structure 402 is used as the pinned layer 206 of the spin valve sensor 300. The AP pinned layer structure 402 includes a first antiparallel pinned (AP1) layer 404 and a second antiparallel pinned (AP2) layer 408 separated by an antiparallel coupling (APC) layer 406. Exchange coupling between the pinning layer 214 and the second antiparallel pinned layer 408 causes a magnetization 412 of the second antiparallel pinned layer 408 to be pinned perpendicular to and away from the ABS. Because of an antiparallel coupling across the antiparallel coupling layer 406, the magnetization 410 of the first antiparallel pinned layer 404 is antiparallel to the magnetization 412 of the second antiparallel pinned layer 408.

In the second embodiment, the first and second antiparallel layers 404 and 408 may be made of cobalt (Co), or alternatively of cobalt iron (Co—Fe), having a thickness in the range of 20–40 Å and the antiparallel coupling layer 406 may be made of ruthenium (Ru) having a thickness in the range of 6–8 Å. It is important, however, that the magnetization of one of the antiparallel pinned layers 404 and 408 be higher than the other antiparallel pinned layer resulting in a finite net magnetization for resetting purposes.

In this example, the pinning layer 214 was 250 Å of nickel manganese (Ni—Mn), the first antiparallel pinned layer 404 was 32 Å of cobalt (Co), the antiparallel coupling layer 406 was 8 Å of ruthenium (Ru), the second antiparallel pinned layer 408 was 32 Å of cobalt (Co), the spacer layer 212 was 24 Å of Cu (Cu), and the free layer 202 was a first ferromagnetic sublayer 218 made of 45 Å of nickel iron (Ni—Fe) and a second ferromagnetic sublayer 220 made of 6 Å of cobalt iron (Co—Fe). The cap layer 226 was 60 Å of tantalum (Ta) on the pinning layer 214 for protecting the pinning layer. The trilayer seed layer structure 302 was the same as used for the simple spin valve sensor 300 of FIG. 13.

After annealing for 10 hours at 260° C. with a magnetic field of 10 kOe in a high vacuum oven, the antiparallel pinned spin valve sensor 400 exhibited a GMR coefficient of 8.1%, a uniedirectional anisotropy field (H$_{UA}$) of 2098 Oe and a ferromagnetic coupling field (H$_F$) of 5.6 Oe. These magnetic ang GMR properties are a substantial improvement over the properties antiparallel pinned Ni—Mn spin valve sensors having a single seed layer of Ta (GMR coefficient=4.3%, H$_{UA}$=1735 Oe and H$_F$=3.2 Oe) or of NiMnO$_x$. (GMR coefficient=6.6%, H$_{UA}$=1903 Oe and H$_F$=5.5 Oe).

It should be noted that although the antiparallel pinned Co layers have the same thickness, a net magnet moment of about 0.08 memu/cm$^2$ still exists due to the loss of magnetic moments at the interface between the Co and Ni—Mn films after annealing. This net magnetic moment is needed for the thermal setting of the antiparallel pinned Ni—Mn spin valve sensor, and is preferred to be very small to lead to a very high H$_{UA}$.

Observations

Each of the three seed layers 304, 306 and 308 plays a unique role in improving the magnetic and GMR properties of the Ni—Mn spin valve sensor of the present invention. The thickness of each of the seed layers is determined by optimizing various magnetic and GMR properties. Experimental data were obtained for simple spin valve sensors with the following layer structure: seed/Ni—Fe(45 Å/Co—Fe(6 Å)/Cu(24 Å)/Co(32 Å)/Ni—Mn(250 Å)/Ta(60 Å) where the "seed" comprised single layer, bilayer or trilayer seed layer structures.

Figure 15:
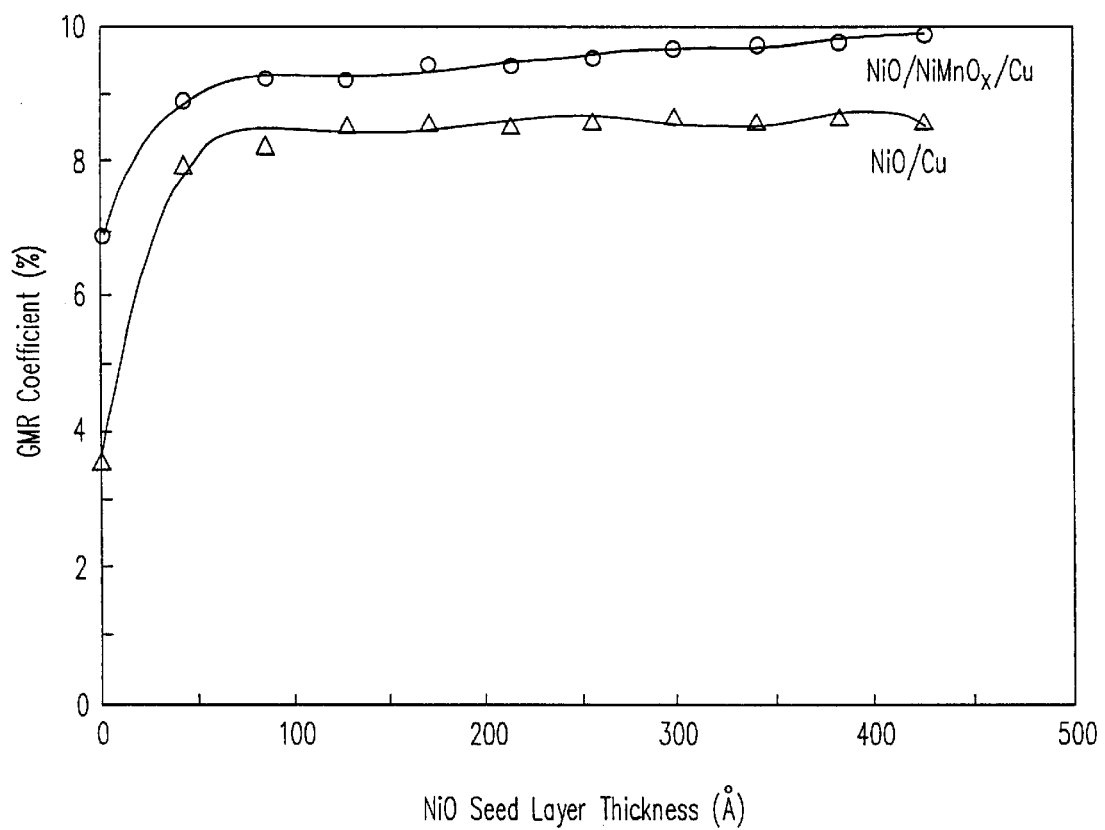
FIG. 15 is a graph of the GMR coefficient versus NiO first seed layer thickness comparing simple Ni—Mn spin valve sensors having NiO/Cu(14 Å) bilayer and NiO/$NiMnO_x$, (30 Å)/Cu(14 Å) trilayer seed layer structures.
Figure 16:
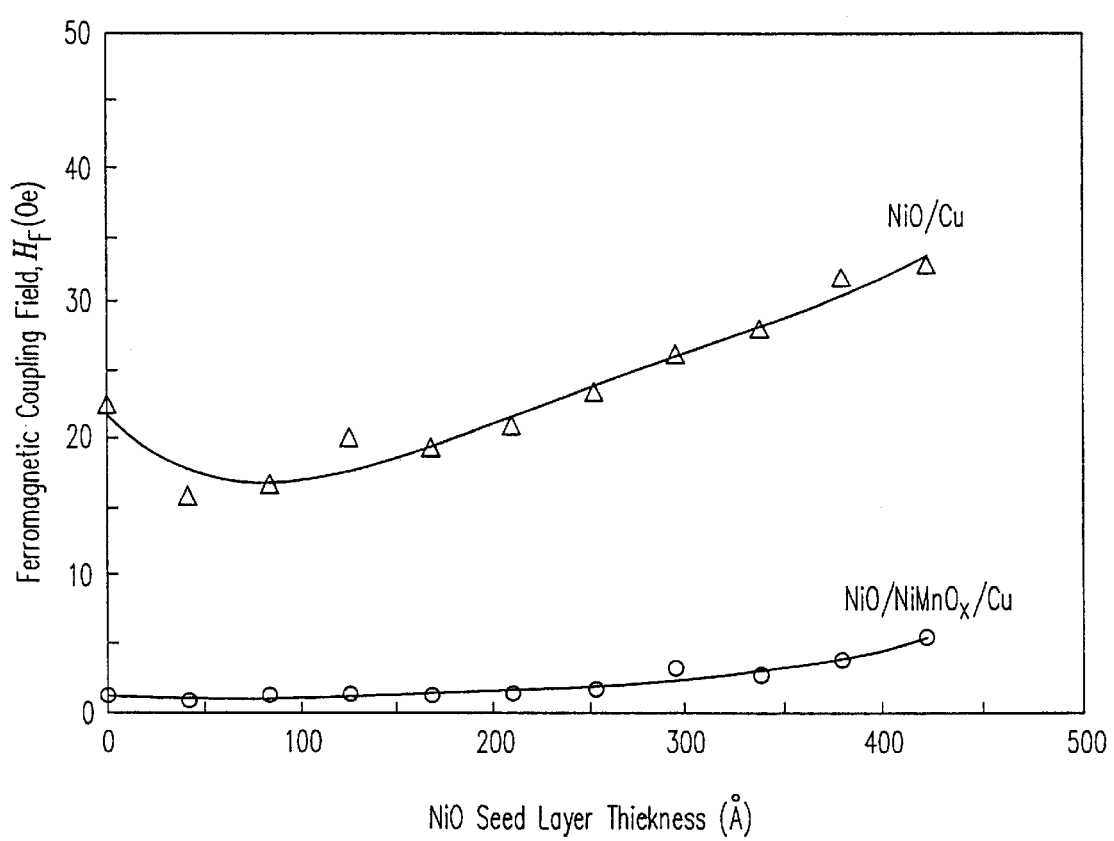
FIG. 16 is a graph of the ferromagnetic coupling field ($H_F$) versus NiO first seed layer thickness comparing simple Ni—Mn spin valve sensors having NiO/Cu(14 Å) bilayer and NiO/$NiMnO_x$(30 Å)/Cu(14 Å) trilayer seed layer structures.
Figure 17:
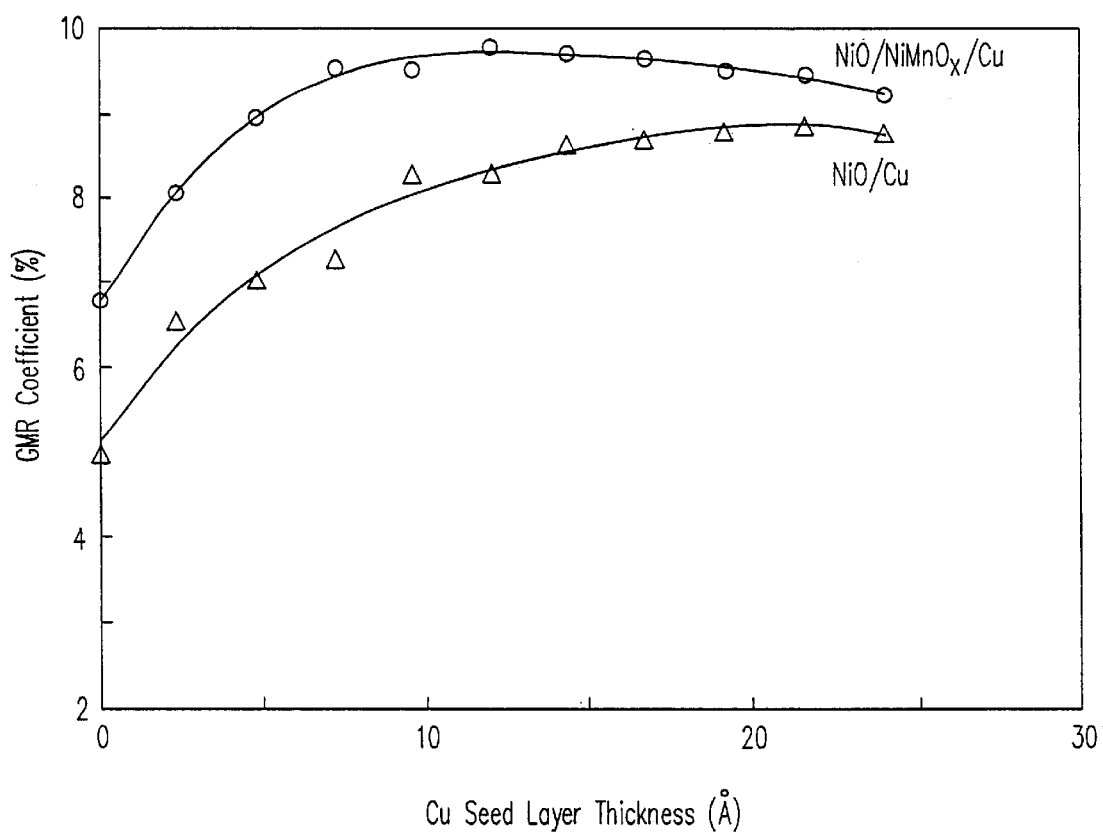
FIG. 17 is a graph of the GMR coefficient versus Cu seed layer thickness comparing simple Ni—Mn spin valve sensors having NiO(330 Å)/Cu bilayer and NiO(330 Å)/$NiMnO_x$(30 Å)/Cu trilayer seed layer structures.
Figure 18:
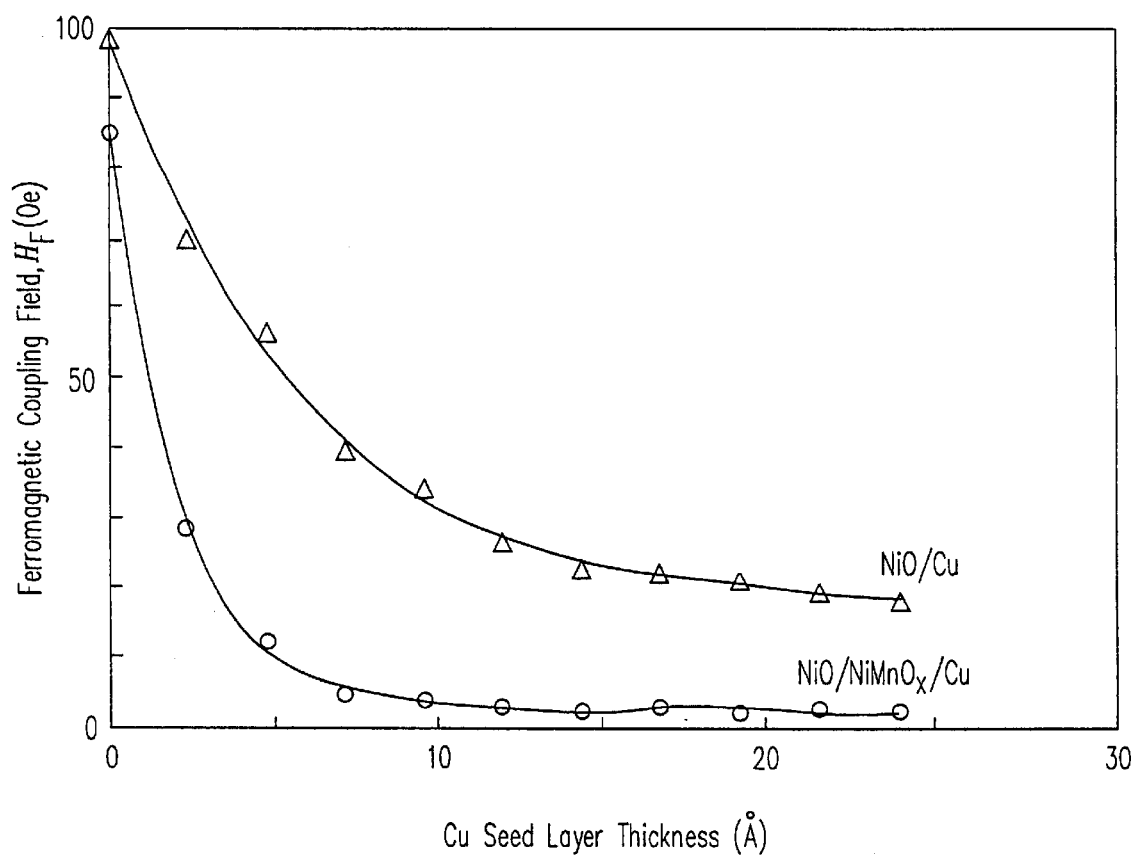
FIG. 18 is a graph of the ferromagnetic coupling field ($H_F$) versus Cu seed layer thickness comparing simple Ni—Mn spin valve sensors having NiO(330 Å)/Cu bilayer and NiO(330 Å)/$NiMnO_x$(30 Å)/Cu trilayer seed layer structures.

FIGS. 15 and 16 are data comparing the GMR coefficient and the ferromagnetic coupling field (H$_F$), respectively, for spin valve sensors with NiO/Cu(14 Å) bilayer and NiO/NiMnO$_x$(30 Å)/Cu(14 Å) trilayer seed layers as a function of the NiO first seed layer thickness. FIGS. 17 and 18 are data comparing the GMR coefficient and H$_F$, respectively, for spin valve sensors with NiO(330 Å)/Cu bilayer and NiO(330 Å)/NiMnO$_x$(30 Å)/Cu trilayer seed layers as a function of the Cu seed layer thickness. As the NiO first seed layer thickness increases, both the GMR coefficient and the ferromagnetic coupling field (H$_F$) increase. The NiO layer contains columnar polycrystalline grains with a strong face-centered-cubic (fcc) {200} crystalline texture which facilitates the growth of grains with a {200} crystalline texture of the layers of the spin valve sensor 300, thereby facilitating the phase transformation in the Ni—Mn layer during annealing. An antiferromagnetic NiO layer thicker than 200 Å exchange couples to the ferromagnetic free layer resulting in an increase of the coercivity of the free layer and an increase in H$_F$. Thin seed layers of nonmagnetic NiMnO$_x$, or Cu inserted between the antiferromagnetic NiO seedlayer and the ferromagnetic Ni—Fe sublayer prevent exchange coupling, while maintaining the microstructural effect of the thick NiO seed layer on the layers of the spin valve sensor.

The NiO/Cu bilayer seed layer structure causes a substantial decrease in H$_F$ and an increase in the GMR coefficient as the Cu seed layer thickness is increased. Unexpectedly, the NiO/NiMnO$_x$/Cu trilayer seed layer structure of the present invention results in H$_F$ decreasing to below 10 Oe and the GMR coefficient increasing to nearly 10% over a wide thickness range of the seed layers, a substantial improvement over the properties obtained with the bilayer seed layer structures.

For the trilayer seed layer structure of the present invention, the first seed layer 304 of NiO may have a thickness in the range of 100–400 Å, with a preferred thickness of 330 Å. The second seed layer 306 on NiMnO$_x$ may have a thickness in the range of 20–40 Å, with a preferred thickness of 30 Å. The third seed layer 308 of Cu may have a thickness in the range of 10–20 Å, with a preferred thickness of 14 Å. With the optimized thicknesses of the three seed layers of the trilayer seed structure 302, the simple Ni—Mn spin valve 300 of the first embodiment of the invention exhibits a GMR coefficient of 9.4%, a unidirectional anisotropy field (H$_{UA}$) of 590 Oe, and a ferromagnetic coupling field (H$_F$) of 2.7 Oe. These magnetic and GMR properties are a substantial improvement over the properties of the simple Ni—Mn spin valve 200 having a single seed layer 214 of Ta (GMR coefficient=5.8%, H$_{UA}$=76 Oe and H$_F$=7.4 Oe) or of NiMnO$_x$, (GMR coefficient=6.8%, H$_{UA}$=412 Oe and H$_F$=11.2 Oe).

Figure 19:
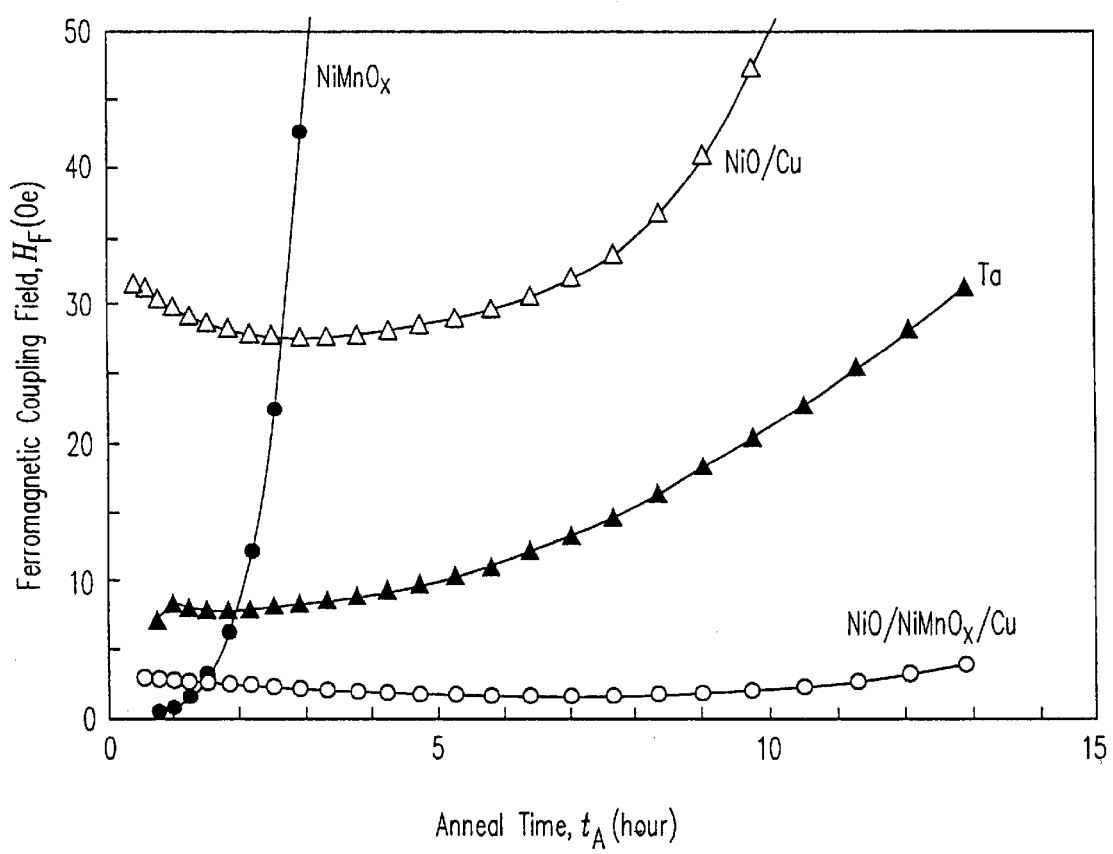
FIG. 19 is a graph of the ferromagnetic coupling field ($H_F$) versus anneal time at 280° C. comparing simple Ni—Mn spin valve sensors having single seed layer structures of Ta(30 Å) and $NiMnO_x$(3 Å), a NiO(330 Å)/Cu(14 Å) bilayer seed layer structure and a NiO(330 Å)/$NiMnO_x$ (30 Å)/Cu(14 Å) trilayer seed layer structure.
Figure 20:
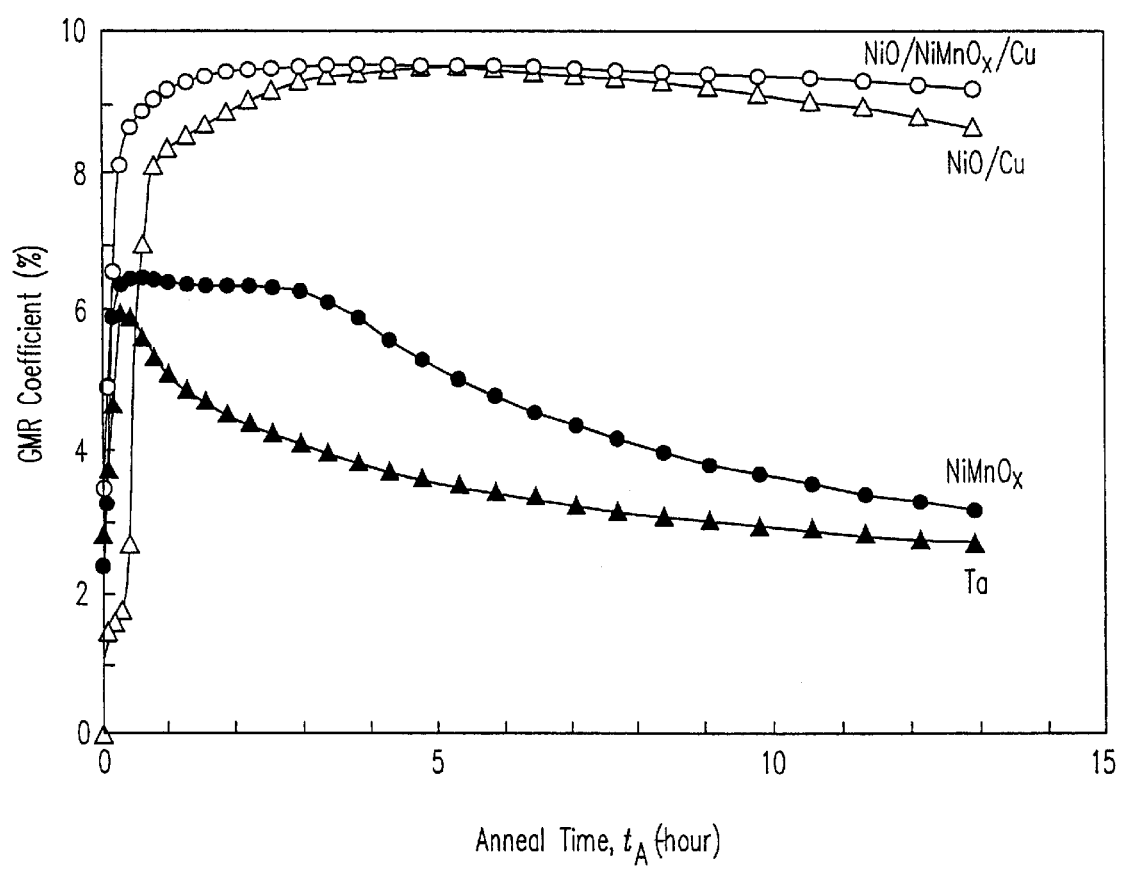
FIG. 20 is a graph of the GMR coefficient versus anneal time at 280° C. comparing simple Ni—Mn spin valve sensors having single seed layer structures of Ta(30 Å) and $NiMnO_x$(30 Å), a NiO(330 Å)/Cu(14 Å) bilayer seed layer structure and a NiO(330 Å)/$NiMnO_x$(30 Å)/Cu(14 Å) trilayer seed layer structure.

FIGS. 19 and 20 are data comparing the ferromagnetic coupling field (H$_F$) and the GMR coefficient, respectively, as functions of annealing time at 280° C. for simple Ni—Mn spin valve sensors having a single seed layer of Ta(30 Å) and NiMnO$_x$(30 Å), a bilayer seed layer of NiO(330 Å)/Cu(14 Å), and a trilayer seed layer of NiO(330 Å)/NiMnO$_x$(30 Å)/Cu(14 Å). FIG. 19 shows that the ferromagnetic coupling field (H$_F$) is significantly lower (less than 5 Oe) for the spin valve sensor having the trilayer seed layer structure of the present invention than for spin valves with single seed layers or a bilayer seed layer. The thermal stability of the spin valve sensor having the trilayer seed layer structure is also significantly better as shown by the low and nearly constant value of H$_F$ to anneal time up to 13.2 hours. FIG. 20 shows that the GMR coefficient of a spin valve sensor having the trilayer seed layer structure of the present invention has improved magnitude and thermal stability compared with spin valve sensors having single seed layers or bilayer seed layers. The GMR coefficient is high (greater than 9%) and relatively constant to anneal times up to 13.2 hours. In addition, the unidirectional anisotropy field (H$_{UA}$) of the Ni—Mn spin valve continues to increase during annealing, reaching a maximum value of 779 Oe after annealing for 6.4 hours at 280° C.

To improve the magnetic and GMR properties of the Ni—Mn spin valve sensor having the trilayer seed layer structure, different sputtering modes have been used to deposit each layer. It was found that the best magnetic and GMR properties are attained when a reactively DC-pulse magnetron sputtering mode using a mixture of argon (Ar) and oxygen (O$_2$) gases is used to deposit the NiO and NiMnO$_x$ seed layers, a DC-magnetron sputtering mode using argon (Ar) gas is used to deposit the Cu seed layer, Cu spacer layer, Co pinned layer, Ni—Mn pinning layer and Ta cap layer, and an ion beam sputtering mode using xenon (Xe) ions is used to deposit the Ni—Fe sublayer and Co—Fe sublayer of the free layer. In particular, the ferromagnetic coupling field (H$_F$) achieves magnitudes below 4 Oe over a wide thickness range of the Cu spacer layer when these sputtering modes are used.

It should be understood that the direction of the magnetic moments of the various layers in the examples, as well as the sense current I$_s$ may be reversed without departing from the spirit of the invention.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:
1. A magnetic read head comprising:
   a spin valve sensor including:
      a ferromagnetic free layer having a magnetization that is free to rotate from a first direction in response to a signal field;
      a ferromagnetic pinned layer having a magnetization;
      a nonmagnetic electrically conductive spacer layer sandwiched between the free layer and the pinned layer;
      an antiferromagnetic pinning layer in contact with the pinned layer and exchange coupled to the pinned layer for pinning the magnetization of the pinned layer; and
      a trilayer seed layer structure comprising:
         a first seed layer comprising nickel oxide (NiO);
         a third seed layer, comprising copper (Cu), directly underlying and in contact with the ferromagnetic free layer; and
         a second seed layer, comprising nickel manganese oxide (NiMnO$_x$), sandwiched between the first seed layer and the third seed layer.
2. The magnetic read head as recited in claim 1 wherein the first seed layer has a thickness in the range of 100–400 Å.
3. The magnetic read head as recited in claim 1 wherein the second seed layer has a thickness in the range of 20–40 Å.
4. The magnetic read head as recited in claim 1 wherein the third seed layer has a thickness in the range of 10–20 Å.
5. A magnetic head assembly comprising a read head and a write head:
   the write head including:
      first and second pole piece layers;
      each of the first and second pole piece layers having a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gaps portions; and
   the read head having a spin valve sensor that includes:
      a ferromagnetic free layer having a magnetization that is free to rotate from a first direction in response to a signal field;
      a ferromagnetic pinned layer having a magnetization;
      a nonmagnetic electrically conductive spacer layer located between the free layer and the pinned layer;
      an antiferromagnetic pinning layer in contact with the pinned layer and exchange coupled to the pinned layer for pinning the magnetization of the pinned layer in a second direction; and
      a trilayer seed layer structure comprising;
         a first seed layer of nickel oxide (NiO);
         a third seed layer directly underlying and in contact with the ferromagnetic free layer, said third seed layer selected from a group of materials consisting of copper (Cu), silver (Ag), gold (Au), and their alloys; and a second seed layer of nickel manganese oxide (NiMnO$_x$) sandwiched between the first seed layer and the third seed layer;

the read head further including:
first and second hard bias and lead layers connected to first and second side edges of the spin valve sensor;
nonmagnetic electrically insulative first and second read gap layers;
the trilayer seed layer structure, the spin valve sensor and the first and second hard bias and lead layers being located between the first and second read gap layers;
a ferromagnetic first shield layer; and
the first and second read gap layers being located between the first shield layer and the first pole piece layer.

6. A magnetic disk drive having at least one slider that has an air bearing surface (ABS), the slider supporting at least one magnetic head assembly that includes a read head and a write head, the disk drive comprising:

the write head including:
first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and the read head having a spin valve sensor that includes:
a ferromagnetic free layer having a magnetization that is free to rotate from a first direction in response to a signal field;
a ferromagnetic pinned layer having a magnetization;
a nonmagnetic electrically conductive spacer layer located between the free layer and the pinned layer; and
an antiferromagnetic pinning layer adjacent to the pinned layer and exchange coupled to the pinned layer for pinning the magnetization of the pinned layer in a second direction;

a trilayer seed layer structure comprising:
a first seed layer, comprising nickel oxide (NiO);
a third seed layer, selected from the group of materials consisting of copper (Cu), silver (Ag), gold (Au), and their alloys, directly underlying and in contact with the ferromagnetic free layer; and
a second seed layer, comprising nickel manganese oxide (NiMnO$_x$), sandwiched between the first seed layer and the second seed layer;

the read head further including:
first and second hard bias and lead layers connected to first and second side edges of the spin valve sensor;
nonmagnetic electrically insulative first and second read gap layers;
the trilayer seed layer structure, the spin valve sensor and the first and second hard bias and lead layers being located between the first and second read gap layers;
a ferromagnetic first shield layer; and
the first and second read gap layers being located between the first shield layer and the first pole piece layer; and
a housing;
a magnetic disk rotatably supported in the housing;
a support mounted in the housing for supporting the magnetic head assembly with the ABS facing the magnetic disk so that the magnetic head assembly is in a transducing relationship with the magnetic disk;
a motor for rotating the magnetic disk;
an actuator arm connected to the support for moving the magnetic head assembly to multiple positions with respect to said magnetic disk; and
a processing circuitry connected to the magnetic head assembly, to the motor for rotating the magnetic disk and to the actuator arm for exchanging signals with the magnetic head assembly, for controlling rotation of the magnetic disk and for controlling the position of the magnetic head assembly.

* * * * *